US012645764B2

(12) United States Patent
Quach

(10) Patent No.: US 12,645,764 B2
(45) Date of Patent: Jun. 2, 2026

(54) CYCLIC PATTERN DETECTION AND PREDICTION EXECUTION

(71) Applicant: SAP SE, Walldorf (DE)

(72) Inventor: Nai Minh Quach, Vitry sur Seine (FR)

(73) Assignee: SAP SE, Walldorf (DE)

( * ) Notice: Subject to any disclaimer, the term of this patent is extended or adjusted under 35 U.S.C. 154(b) by 761 days.

(21) Appl. No.: 18/082,041

(22) Filed: Dec. 15, 2022

(65) Prior Publication Data

US 2024/0202287 A1     Jun. 20, 2024

(51) Int. Cl.
*G06F 18/00*     (2023.01)
*G06F 16/00*     (2019.01)
(Continued)

(52) U.S. Cl.
CPC ............ *G06F 18/26* (2023.01); *G06F 16/215* (2019.01); *G06F 16/2272* (2019.01);
(Continued)

(58) Field of Classification Search
CPC ........ G06F 18/26; G06F 18/214; G06F 18/10; G06F 18/2321; G06F 17/18; G06F 16/2365; G06F 16/215; G06F 16/2477; G06F 16/24568; G06F 16/2272; G05B 23/0221; G05B 23/0224; G05B 23/0229; G05B 23/0243; G05B 23/0245; G06N 20/00; G06N 5/022
See application file for complete search history.

(56) References Cited

U.S. PATENT DOCUMENTS 11,663,290 B2 * 5/2023 Vishwakarma ....... H04W 84/18
                                                      370/329
2010/0031156 A1 * 2/2010 Doyle ................... H04L 41/142
                                                      715/736
(Continued)

FOREIGN PATENT DOCUMENTS

WO     WO2020164740 A1 *  8/2020
WO     WO 2022046734 A1 *  3/2022

OTHER PUBLICATIONS

Yun Yang et al., "Efficient and robust time series prediction model based on REMD-MMLP with temporal-window", Expert Systems with Applications, vol. 207, Nov. 30, 2022, 117979, pp.*
(Continued)

*Primary Examiner* — Srirama Channavajjala
(74) *Attorney, Agent, or Firm* — Fish & Richardson P.C.

(57)     ABSTRACT
The present disclosure relates to computer-implemented methods, software, and systems for identifying cyclic patterns in data observations collected as time series with irregular time spacing between each other. Distribution of the time occurrences associated with the data observations is analyzed to identify a cyclic pattern. A list of time gaps between each of the data observations is defined. Time gaps are defined according to a common time measure. The time gaps of the list of time gaps are evaluated using two reader operators that separately browse through the list of time gaps. A cyclic pattern is identified in the list of time gaps based on the iteratively evaluating. The identifying comprises identifying (i) a length of cycle within the cycle patterns and (ii) an index element of a time gap of the list of time gaps.

18 Claims, 7 Drawing Sheets

(51) Int. Cl.

| | |
|---|---|
| *G06F 16/215* | (2019.01) |
| *G06F 16/22* | (2019.01) |
| *G06F 16/23* | (2019.01) |
| *G06F 16/2455* | (2019.01) |
| *G06F 16/2458* | (2019.01) |
| *G06F 18/10* | (2023.01) |
| *G06F 18/214* | (2023.01) |
| *G06F 18/2321* | (2023.01) |
| *G06F 18/26* | (2023.01) |
| *G06N 5/00* | (2023.01) |
| *G06N 5/022* | (2023.01) |
| *G06N 20/00* | (2019.01) |

(52) U.S. Cl.

CPC .... *G06F 16/2365* (2019.01); *G06F 16/24568* (2019.01); *G06F 16/2477* (2019.01); *G06F 18/10* (2023.01); *G06F 18/214* (2023.01); *G06F 18/2321* (2023.01); *G06N 5/022* (2013.01); *G06N 20/00* (2019.01)

(56) References Cited

U.S. PATENT DOCUMENTS

| | | | | |
|---|---|---|---|---|
| 2011/0119374 A1* | 5/2011 | Ruhl | ...................... | G06Q 10/06 |
| | | | | 709/224 |
| 2014/0108640 A1* | 4/2014 | Mathis | ................. | H04L 41/147 |
| | | | | 709/224 |
| 2016/0062950 A1* | 3/2016 | Brodersen | .......... | G06F 18/2433 |
| | | | | 702/181 |
| 2019/0228353 A1* | 7/2019 | Gefen | ................. | G06Q 10/067 |
| 2019/0392252 A1* | 12/2019 | Fighel | ..................... | G06F 17/18 |
| 2021/0319341 A1* | 10/2021 | Han | ........................ | G06N 3/084 |
| 2022/0292308 A1* | 9/2022 | Schwiep | ................ | G06N 20/20 |
| 2023/0022401 A1* | 1/2023 | Amiri | ..................... | H04L 41/16 |
| 2023/0119568 A1* | 4/2023 | Wang | ................. | G05B 23/0221 |
| | | | | 703/2 |
| 2023/0122150 A1* | 4/2023 | Rawat | .................... | G06N 20/20 |
| | | | | 706/12 |
| 2023/0185579 A1* | 6/2023 | Eranpurwala | .......... | G06N 20/10 |
| | | | | 713/2 |

OTHER PUBLICATIONS

Rohitash Chandra et al., "Evaluation of Deep Learning Models for Multi-Step Ahead Time Series Prediction", IEEE Access ( vol. 9, May 2021, pp. 83105-83123.*

Wikipedia.org [online], "Cycle detection" created on May 2004, retrieved on Dec. 15, 2022, retrieved from URL <https://en.wikipedia.org/wiki/Cycle_detection#:~: text=Floyd's%20cycle%2Dfinding%20algorithm%20is,The%20Tortoise%20and%20the%20Hare>, 10 pages.

Wikipedia.org [online], "Training, validation, and test data sets" created on Feb. 2005, retrieved on Dec. 15, 2022, retrieved from URL <https://en.wikipedia.org/wiki/Training,_validation,_and_test data sets#Validation data set>, 6 pages.

* cited by examiner

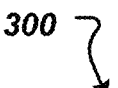

300

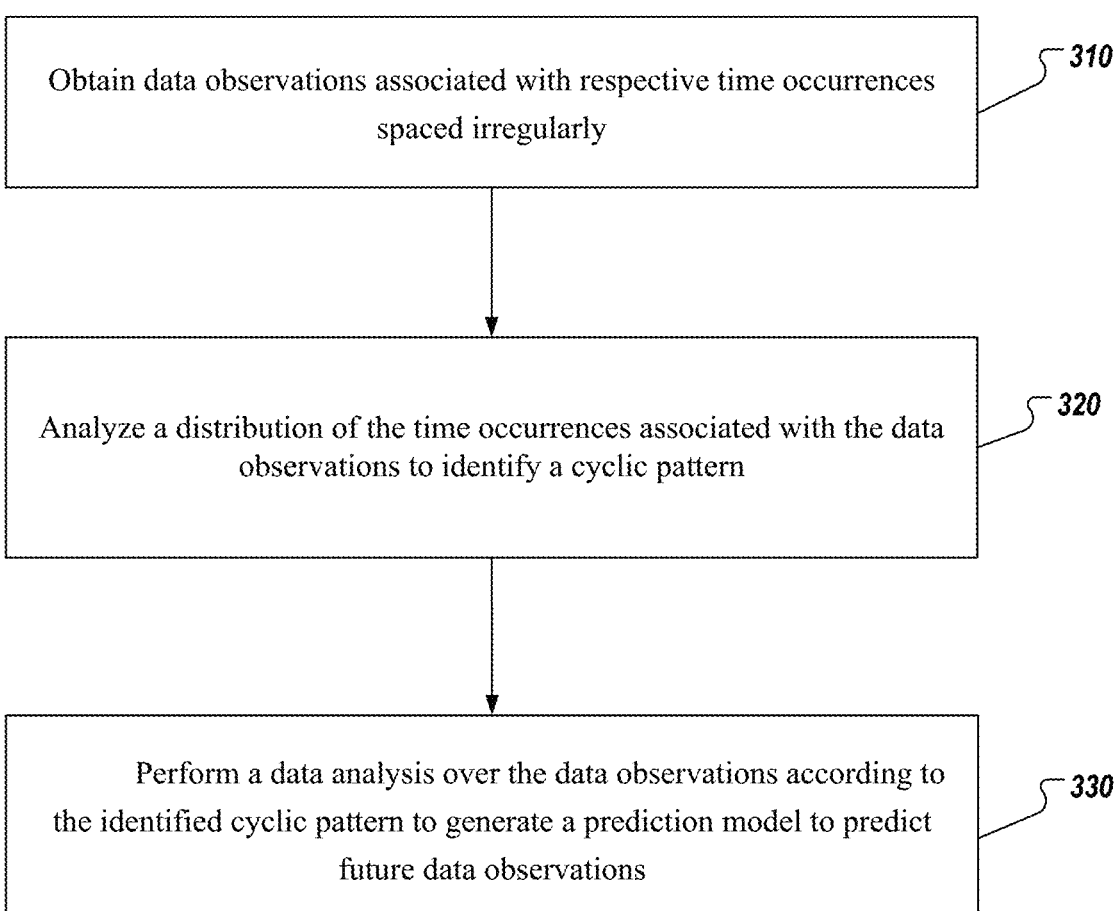

Obtain data observations associated with respective time occurrences spaced irregularly     310

Analyze a distribution of the time occurrences associated with the data observations to identify a cyclic pattern     320

Perform a data analysis over the data observations according to the identified cyclic pattern to generate a prediction model to predict future data observations     330

FIG. 3

CYCLIC PATTERN DETECTION AND PREDICTION EXECUTION

TECHNICAL FIELD

The present disclosure relates to computer-implemented methods, software, and systems for data processing.

BACKGROUND

Software complexity is increasing and causes changes to lifecycle management and maintenance of software applications, databases, and platform systems. Customers' needs are transforming and imposing higher requirements for process execution, lifecycle management, and technical landscape that also support high-availability to access software resources provided by the underlying platform.

Software applications, systems, devices, processes, and other examples, can be associated with data monitoring and prediction of execution results and/or performance. Data observations from various sources can be observed to generate prediction models that can be used in the context of data simulation and automation.

SUMMARY

Implementations of the present disclosure are generally directed to a computer-implemented method for identifying cyclic patterns in data observations collected as time series with irregular time spacing between each other.

One example method may include operations such as obtaining data observations associated with respective time occurrences, wherein the respective time occurrences are spaced in time from each other with irregular time intervals; analyzing a distribution of the respective time occurrences associated with the data observations to identify a cyclic pattern, wherein the analyzing includes: defining a list of time gaps between each of the data observations, wherein time gaps of the list of time gaps are defined according to a common time measure, and wherein each time gap in the list of time gaps is associated with a respective data observation; iteratively evaluating, as evaluated time gaps, the time gaps of the list of time gaps using two reader operators that separately browse through the list of time gaps, wherein each reader operator identifies, for each evaluated time gap of the evaluated time gaps, subsequent time gaps after each evaluated time gap of the evaluated time gaps, wherein the iteratively evaluating is performed to determine a cycle in the list of time gaps that includes a cyclic set of the subsequent time gaps of the list of time gaps that is repetitive in the list of time gaps; and identifying, as an identified cyclic pattern, a cyclic pattern in the list of time gaps based on the iteratively evaluating, wherein the identifying includes identifying (i) a length of cycle within the cycle patterns and (ii) an index element of a time gap of the list of time gaps that is associated with a start element of a first cycle identified in the list of time gaps; and performing a data analysis over the data observations according to the identified cyclic pattern to generate a prediction model to predict future data observations.

In some instances, the data observations can be collected from a system monitoring process to identify availability of service resources.

In some instances, the data observations can include data collected from an execution of a process flow at a platform system.

In some instances, the prediction model can be used to predict the future data observations for a future horizon defined according to the cyclic pattern.

In some instances, the two reader operators can perform iterative evaluation using two respective moving pointers through the time gaps of the list of time gaps to determine, at each iteration of each moving pointer, one or more sets of subsequent time gaps of the list of time gaps. The two respective moving pointers are associated with a different iterative step between time gaps in the list of time gaps. The cycle can be determined when the cyclic set of subsequent time gaps is identified at a correspondingly iteratively evaluated time gap by each of the two reader operators.

In some instances, each of the moving pointers iterate over a respective set of time gaps of the list of time gaps. A first iterative step associated with a first moving pointer of a first reader operator can be twice as slow as a second iterative step associated with a second moving pointer of a second reader operator.

In some instances, identifying the cyclic pattern can include: identifying a first time gap in the list of time gaps that is iterated using a first reader operator that is associated with a first set of subsequent time gaps of the list of time gaps that matches a second time gap in the list of time gaps that is iterated using a second reader operator that is associated with a second set of subsequent time gaps, wherein the first set of subsequent time gaps is equivalent to the second set of subsequent time gaps, and wherein the first time gap is different than the second time gap; identifying the length of cycle to correspond to a number of time gaps in the first set of subsequent time gaps; and identifying the index element of a time gap of the list of time gaps as the start element of the cycle to correspond to a lowest index element of either a first index element corresponding to the first time gap or a second index element corresponding to the second time gap in the list of time gaps.

In some instances, the example method can include generation of a time series for distributing future data observations based on an initial time instance for the time series and the identified cyclic pattern.

In some instances, the first moving pointer associated with a first reader operator can browse over each time gaps of the list of time gaps, and a second moving pointer associated with a second reader operator can browse over every other time gap of the list of time gaps. The first reader operator and the second reader operator can terminate browsing when an evaluation occurs of two time gap instances associated with equivalent sets of subsequent time gaps within the list of time gaps.

In some instances, the common time measure can be a unit of time selected from the group consisting of a day, a week, a month, a quarter, and a year.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

The subject matter described in this specification can be implemented to realize one or more of the following advantages. Prediction services implemented in accordance with the implementations of the present disclosure can support execution and automation of processes and systems in various technical fields as they provide reliable output that can be fed as input for subsequent flow executions. In some instances, by executing forecasting services that provide improved accuracy in identifying patterns, such as cyclic patterns, prediction results can be reliably used in the automation of process and/or system execution. For example, the identification of the cycles can be implemented with multiple moving pointers over several iteration, thus, the identification of the cyclic patterns can be performed faster, which supports efficient planning and integration of the predicted results into real-time system executions that optimize utilization of resources and reduces the need of manual interaction and adjustments of the data.

BRIEF DESCRIPTION OF DRAWINGS

FIG. 3 is an example method flow diagram for identifying cyclic patterns in data observations associated with irregular time occurrences in accordance with implementations of the present disclosure.

DETAILED DESCRIPTION

The present disclosure describes various tools and techniques for identifying cyclic patterns in data observations collected as time series with irregular time spacing between each other. The identification of cyclic patterns in collected data observations can be used in execution of predictive services based on forecasting models for predicting future expected data observations. The result from such predictive services can be used for automating process executions, system maintenance, adjustments to sensors and devices in physical spaces, or device work schedules, among other example of utilization.

Figure 1:
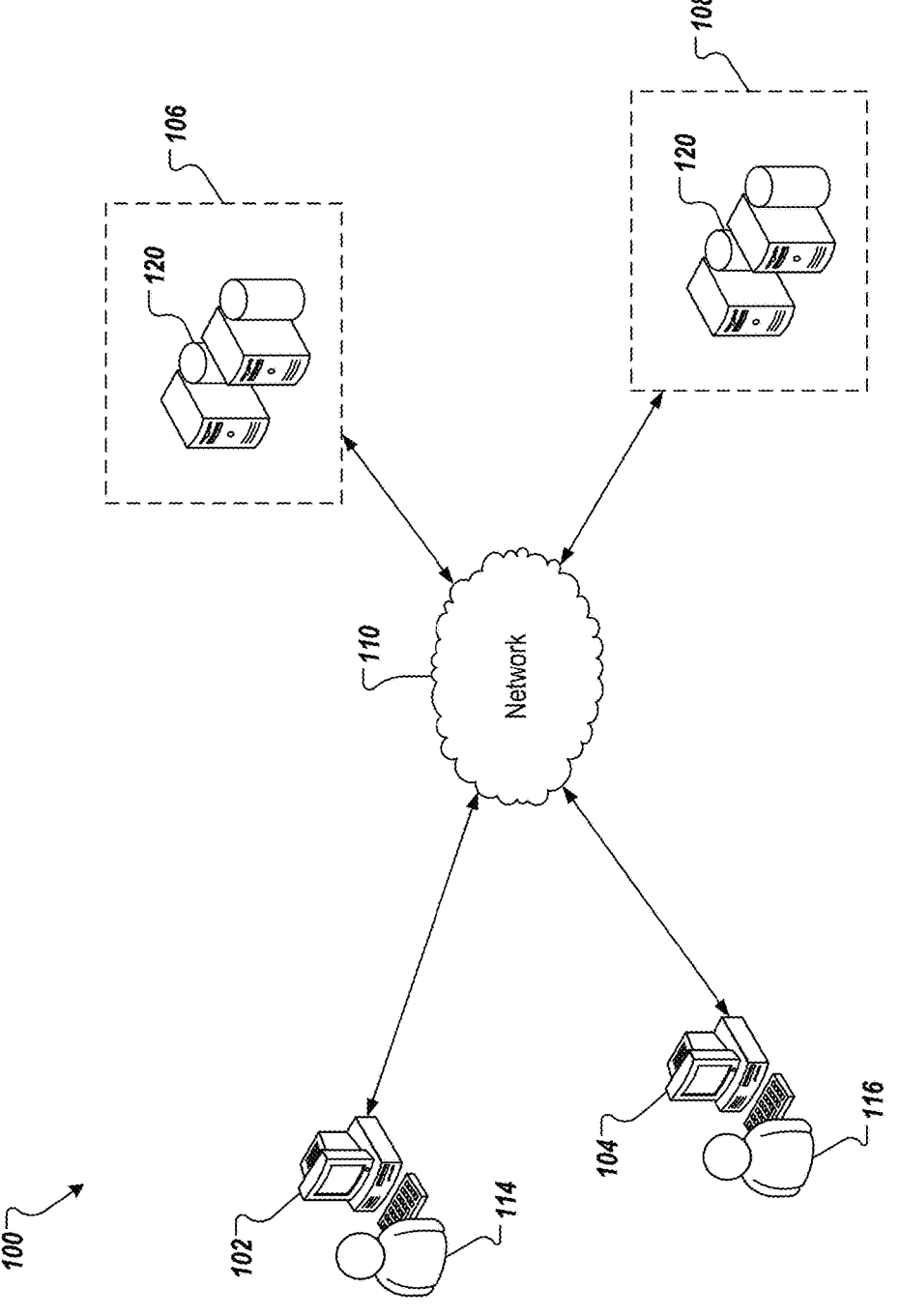
FIG. 1 is a block diagram depicting an example computer-implemented system that can execute implementations of the present disclosure in accordance with implementations of the present disclosure.

FIG. 1 is a block diagram depicting an example of a computer-implemented system 100 that can execute implementations of the present disclosure in accordance with implementations of the present disclosure. In the depicted example, the example system 100 includes a client device 102, another client device 104, a network 110, a cloud environment 106, and a cloud environment 108. The cloud environment 106 may include one or more server devices and databases (for example, processors and memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices, or other data processing devices. In some implementations, the network 110 can include a large computer network, such as a local area network (LAN), a wide area network (WAN), the Internet, a cellular network, a telephone network (for example, a public switch telephone network (PSTN)), or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the cloud environment 106 can host applications and databases running on the host infrastructure. In some instances, the cloud environment 106 can include multiple cluster nodes that can represent physical or virtual machines that can represent web node clusters. A hosted application and/or service can run on VMs hosted on cloud infrastructure.

In some instances, the cloud environment 106 and/or the cloud environment 108 can provide infrastructure for executing data evaluation over data observations collected at time occurrences that are spaced with irregular time gaps as further described in relation to FIGS. 2, 3, 4, and 5.

Figure 2:
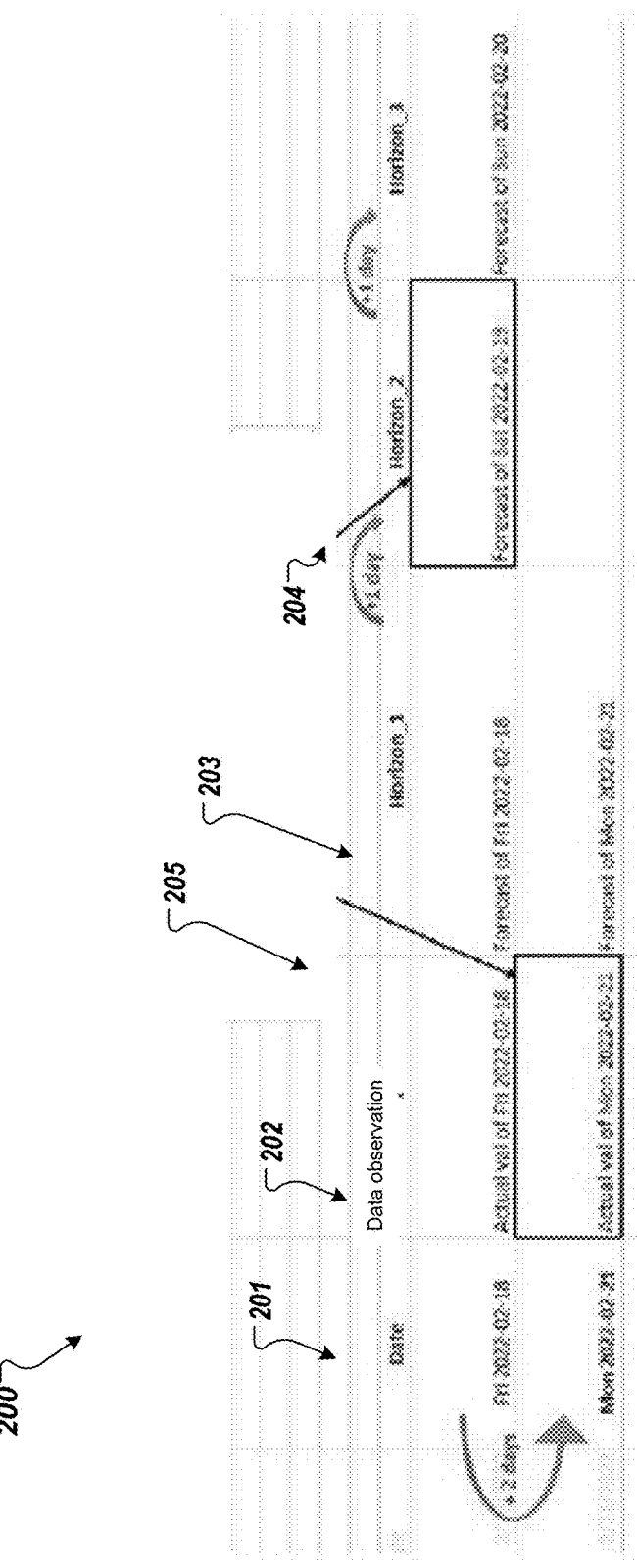
FIG. 2 is a block diagram of an example of time series data to be used for performing data prediction in accordance with implementations of the present disclosure.

FIG. 2 is a block diagram of an example of time series data 200 to be used for performing data prediction in accordance with implementations of the present disclosure.

In some instances, the time series data 200 can include data observations that are each associated with a time occurrence (for example, a time stamp such as Friday 2022-02-18). The time occurrences of each data observation can be distributed with irregular time gaps, for example, only business days of the month. The time series data 200 can be organized to include date and/or time values and data observation values.

In some instances, the time series data 200 can be collected from execution of various processes executed at a system or a server. For example, the collected data can be data for the availability of hardware resources in a system executing a workflow, a number of executed service instances at a software system per day according to a working schedule such as Monday to Fridays workdays, or collected based on sensor input (for example, temperature, humidity, wind, street traffic intensity, crows size at public spaces, and other). The collected time series data 200 as data observations at respective times and dates can be used as a base for executing prediction and forecasting methods. The predictions and forecasts, as results from such execution, can be used in various context, for example, automation of process execution, automated re-configuration of physical device settings (for example, defining a schedule for turning on and off an air-conditioner in an automated manner based on temperature data evaluation, automated order scheduling based on expected demand, or automated maintenance of virtual environment resources based on expected resource load, among other example utilizations).

In some instances of time series forecasting, the time series data is collected or obtained at time instances (for example, dates and time) that are not spaced at regular intervals (for example, have irregular sampling frequency). For example, a time series can be a daily series including data observations collected for business days only (from Monday to Friday, not Saturday and Sunday). As another example, a time series can be a monthly series that excludes the month of August from all the months of the year. In these example series, the time occurrences are associated a regular cyclic pattern that includes a sequence of time gaps between time occurrences that repeat over time.

For example, in a daily series including data observations for business days only, the time gaps between the time occurrences of the data observations (in this case days) can be obtained with a cyclic sequence of the number of days (as time gaps) between each of the time occurrences of the data observations. In this example, the cyclic sequence that can be observed in a business-day time series is [1, 1, 1, 1, 3], where the time gaps are defined based on the number of days between each occurrence.

In another example of a time series that is a monthly series that excludes August as a month (for example, production is closed in August) for obtaining observations, the time gaps between the time occurrences (for example, once per month excluding September) can be expressed as an a cyclic sequence of time gaps defined according to a measure unit such as a month in the following format: [1, 1, 1, 1, 1, 1, 1, 2, 1, 1, 1]. The cyclic pattern in this example can be defined according to months as a unit of measure. In other example time series data, other times of unit of measure for defining time gaps between data time occurrences can be used, such as months, weeks, quarters, years, or other.

In the above presented examples, the data observations are taken in an irregular time schedule since between each two data observations there is no equal (or substantially equal) time gap. For example, in the business-day time series, the time gap between Friday and a next Monday is 3 days, while between each other time occurrences the time gap is 1 day. Further, in the monthly series example that excludes August, the time gap between all the data observations is 1 month but for one time gap (that is, after July) that is 2 months.

In some instances, when executing forecasting algorithms based on time series data, the correct definition of future time occurrences of future expected observations may be essential. In such manner, out-of-sample forecasting performance and cyclic pattern detection (for example, seasonality) can be properly done. For example, in the business-days time series example, if a predictive algorithm is not aware of the true sampling frequency of the data observations, the predictive algorithm may evaluate the data observations according to an expected daily frequency between the time occurrences, which can be a mistake in the cases where Saturday and Sunday are not working days.

As shown in FIG. 2, a predictive algorithm can determine forecasted values based on the data observations 202 and without properly identifying the sampling frequency, may define a horizon of future dates (for example, every day of the week) to perform the forecasting that does not comply with the true sampling frequency (for example, business days only). In such case, a forecasting algorithm may fail to correctly evaluate the out-of-sample forecasting performance. As shown, the algorithm may define prediction values for Horizon 203 and Horizon 204 that can be defined to conform to an every-day schedule, rather than to the true cyclic frequency identified for the data observations 202 (for example, business days only, for example, the next business day after Friday is Monday and the actual value on Monday is observed at 205). The horizon for a data observation can be defined as the data observations at time occurrences that include the latest obtained data observation and one or more subsequent data observations at time occurrences corresponding to the sampling frequency that is expected to correspond to the sample. As such, the forecasting algorithm would predict as a data observation for a horizon after Friday to be an observation for Saturday, as shown at 204, rather than for Monday, as shown at 205. If the distribution or sample frequency of the observed data is not identified accurately, predictions for data on Saturday and/or Sunday may be obsolete and erroneous, since they are not based on actual values because no data observations were collected for such non-business days. If forecasting algorithm relies on false assumption for the distribution, that can lead to building predictive models and components that do not accurately predict the expected values, and thus does not adequately reflect the observed processes and/or systems associated with the collected sample data.

In accordance with the present disclosure, time series data can be evaluated to determine whether the time occurrences associated with obtained data observations conform to a cyclic pattern. Such identification of a cyclic pattern can be used for a prediction model definition and execution that supports efficiency, accuracy, and timeliness.

FIG. 3 is an example method flow diagram 300 for identifying cyclic patterns in data observations associated with irregular time occurrences in accordance with implementations of the present disclosure. In some instances, the sample data including the data observations at irregularly spread time occurrences and their distribution or sample frequency can be substantially similar to the examples provided in relation to FIG. 2.

At 310, data observations can be obtained. The data observations can be associated with respective time occurrences where the occurrences can be spread irregularly from one another on a timeline. For example, the data observations can be collected as historical data that can be input into an intelligent forecasting algorithm for predicting performance and execution of an observer system, device, or environment.

For example, the data observations can be collected from a system monitoring process to identify availability of service resources. In some examples, the data observations can include data collected from an execution of a process flow at a platform system.

At 320, a distribution (or sample frequency) of the time occurrences associated with the data observations can be analyzed to identify a cyclic pattern.

In some instances, based on the data observations and the corresponding time occurrences of each data observation as obtained at 310, a list of time gaps between the time occurrences of the data observations can be determined. For example, a list L of a sequence of numbers corresponding to time gaps between each data observation and a next data observation can be defined. For example, the list L can be defined for a business-day time series, where L can be equal to L=[1, 1, 1, 1, 3, 1, 1, 1, 1, 3, . . . ]. The elements of the list L represents the gaps between the business days in a daily series. The list L is evaluated to determine whether there is a cycle in L. A cycle can be defined by two quantities, λ and μ, where:

(1) λ: the length of the cycle that is to be determined, and (2) μ: the index (for example, index 0 identifies a first element) of the first element in L from which the cycle starts.

In the example of business-days time series, λ=5 and μ=0 (if the initial element of the list L is with index 0).

Once λ and μ are known, the cyclic pattern can be identified as the elements ranging between μ-th and (μ+λ)-th element in the sample of the data observations.

In some instances, the distribution of time occurrences can be analyzed to determine λ and μ, by browsing through the list of time gaps L using two reader operators. The browsing of the list can be performed to identify two indices i and j in L, that fulfill the following equations:

(3) j=2i=i+k λ where k is a positive integer, and (4) L [i: i+K]=[j: j+K], K being an integer such that K>=λ.

In some instances, if there are two reader operators (or readers) that browse the list L, those two readers can browse the list in a fast and a slow pace to more efficiently determine two indices in the list L that comply with the above equations and in practice "see" the same set of subsequent time gaps (a cyclic set of subsequent time gaps) in the list at different positions in the list.

Figure 4A:
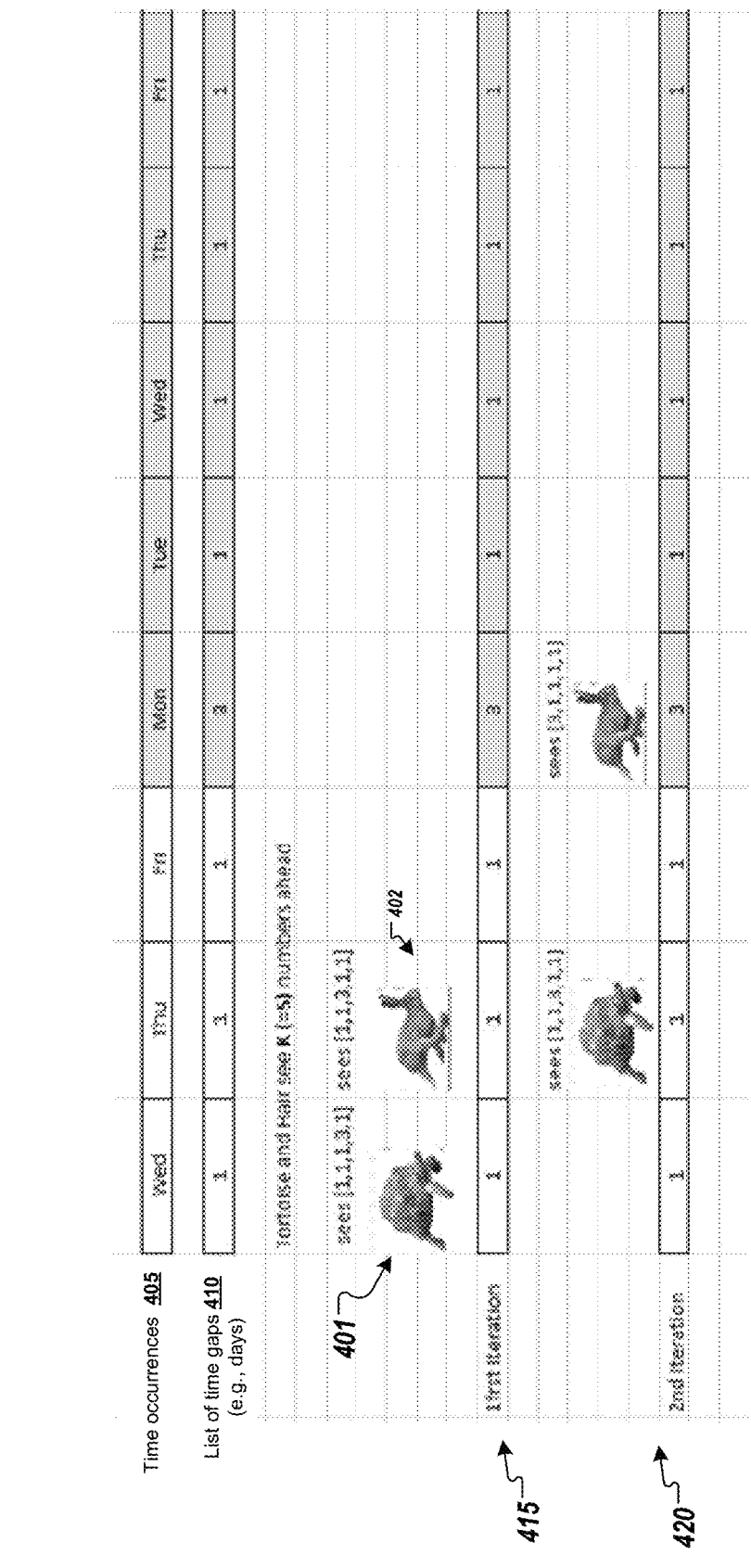
FIG. 4A is a swim-lane diagram of an example of browsing, using two separate reader operators, a list including time gaps defined for data observations at time occurrences associated with irregular time intervals between each other.
Figure 4B:
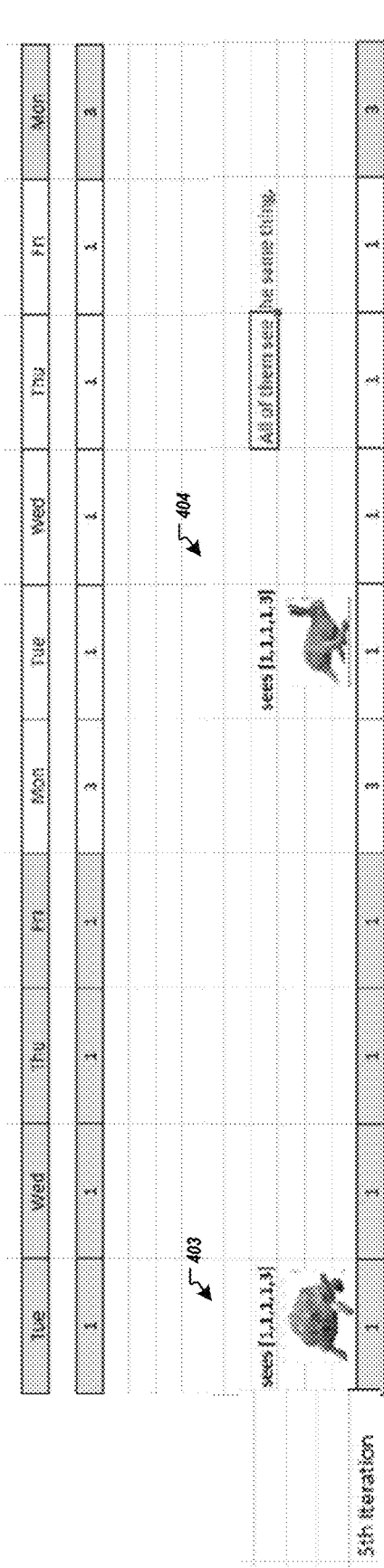
FIG. 4B is a swim-lane diagram of an example of browsing the list of time gaps as described in FIG. 4A, using the two separate reader operators at a fifth iteration.

In some instances, the analyses of the distribution of the time occurrences to identify a cycle pattern can be performed as described in further detail at FIGS. 4A and 4B.

At 330, a data analysis can be performed over the data observations according to the identified cyclic pattern to generate a prediction model to predict future data observations.

In some instances, the identification of the cyclic pattern can help in analyzing the data observations in a more efficient and accurate manner that takes into account the specifics of the data distribution over time that can be tightly related to the specifics of the monitored process or system.

FIGS. 4A and 4B describe browsing of a list including time gaps in iterations. FIG. 4A is a swim-lane diagram of an example browsing 400, using two separate reader operators, a list including time gaps defined for data observations at time occurrences associated with irregular time intervals between each other. FIG. 4B is a swim-lane diagram of an example of browsing the list of time gaps as described in FIG. 4A, using the two separate reader operators at a fifth iteration.

In the example of FIGS. 4A and 4B, the time occurrences 405 associated with data observations are presented as days of the working week, for example, Wednesday, Thursday, Friday, Monday, Tuesday, Wednesday, and so forth. Based on the time occurrences 405, a list of time gaps 410 is defined. In some instances, the time gaps between each two occurrences can be defined according to a common time measure, for example, days. In some instances, more than one time measure can be used to define the gaps in a different manner. In some instances, the time measure to be used for the definition of the list of time gaps can be predefined, for example, to match to an observed process or a pre-defined conditions for defining future observations.

In some instances, two reader operators are used to browse the list of time gaps 410—a first reader that is a slow one, "Tortoise", and a second reader that is a faster one, "Hare". The first and the second reader can browse the list of time gaps according to moving pointers through the list, where for example, one of the readers can read and evaluate every single element of the list 410, and the second one can read and evaluate every other element of the list 410. In some instances, the step of browsing the list based on either one of the readers can be configured different, for example, the first one can read every other element, and the second one can read the list by skipping two elements at a time (between iterations). Other possible browsing combination of two readers can be possible.

In some instances, the moving pointer of the first reader is at position 401 at the first iteration 415, where it can be determined that the Tortoise (as an indicator of the pointer of the first reader) "sees" as a horizon including a set of subsequent time gaps the set equal to [1,1,1,3,1], where the set includes the time gaps as defined in the list of time gaps 410 for the element where the Tortoise is positioned (that is, first element that can be with index=0) and a set of subsequent element. The moving pointer of the second reader is at position 402 at the same iteration 415, where it can be determined that the Hare "sees" as a horizon including a set of subsequent time gaps the set equal to [1, 1, 1, 1, 1]. In the present example, the horizon is defined for 5 elements, where other definitions of horizons including more elements can be used as well. For example, the definition of the size of a horizon to be used when evaluating what is seen at each moving pointer can be configured automatically based on a default set-up, based on a user provided input, or dynamically during execution. At the first iteration 415, the second moving pointer can be positioned one step after the first pointer, (start from element 2 which can be defined to be with index 1), and can see a different set of subsequent time gaps in the list 410, that is, [1,1,3,1,1]. The horizon seen from the second pointer can be defined in substantially similar manner as the one for the first pointer.

At each iteration, Tortoise and Hare looks K elements ahead from their current position. If they observe the same thing (equation (4) above), then they can verify the equations (3) and (4) as presented above and determine a first occurring cycle. At iteration 415, 420, and 430, the seen horizon from the perspective of each of the pointers from the two readers can be evaluated and compared to determine whether they comply with the equations (3) and (4), so that each of the sets of subsequent time gaps seen from the different pointers and different indices in the list 410 match. At the first iteration 415 and at the second iteration 420, it can be determined that these sets of subsequent time gaps do not match.

At FIG. 4B, the fifth iteration 430 during browsing the list of time gaps as described in relation to FIG. 4A is presented. At the fifth iteration 430, the seen time gaps (sets of seen time gaps from the list) at position 403 and at position 404, where both are associated with moving pointers of each of the two readers match, thus, it can be determined that there is a cycle in the list of gaps, where the starting position of the cycle is element 403 with index 4 (where index 0 corresponds to the first element), since there is the position of the moving pointer of the Tortoise reader, and the length of the cycle is the number of elements between the element 403 and element 404, that is, five (5).

The cycle length A and the start element y for the cycle can be determined according to the equation (3) above. In the present example 400, to detect a cyclic pattern like "Business Days" in a time series, it may require to perform five (5) iterations with two readers. The computational complexity of search browsing is $O(\lambda+\mu)$, that is proportional to the sum of the cycle length ($\lambda$) and the index of the first element where the cycle starts.

Figure 5:
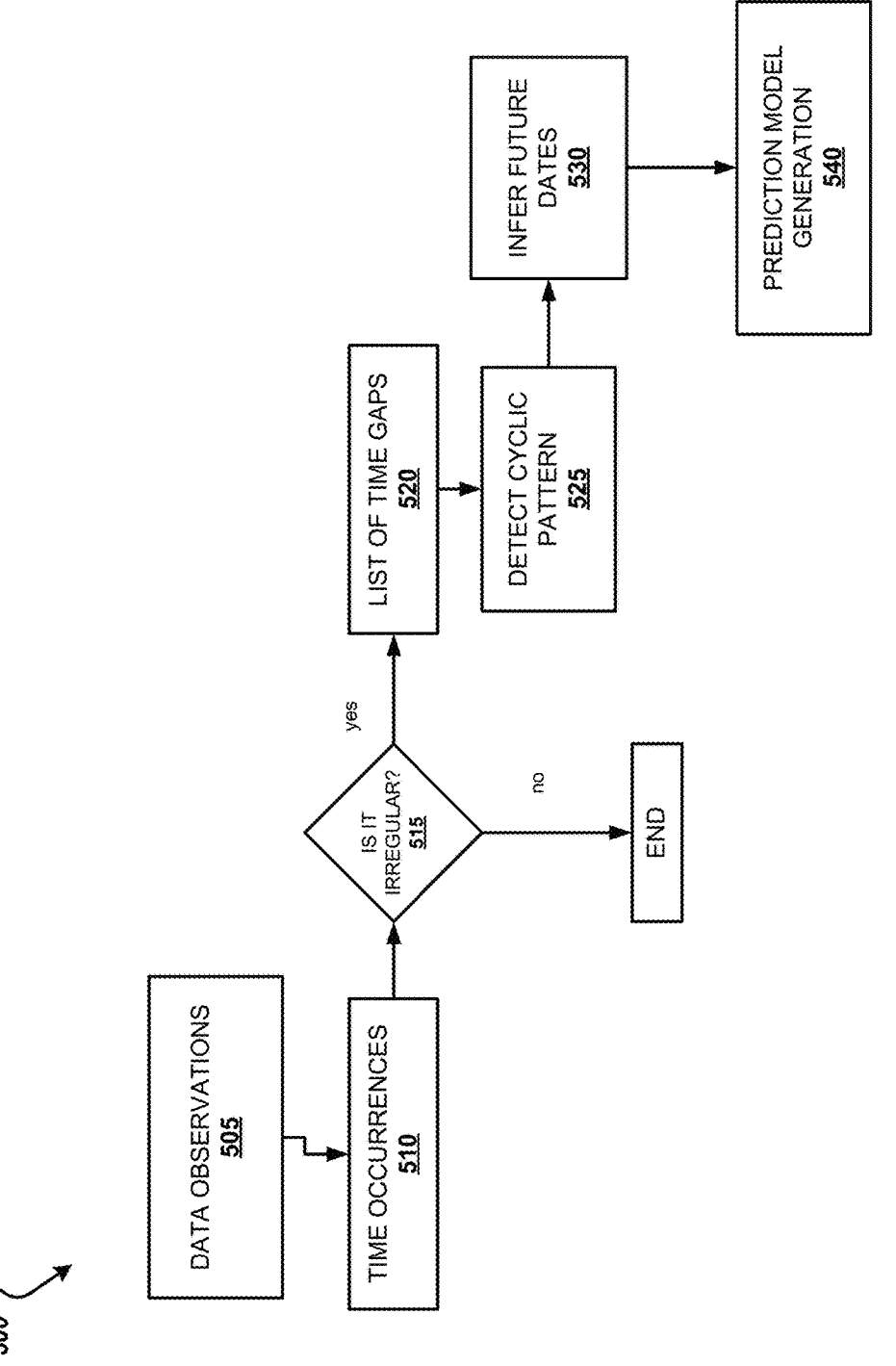
FIG. 5 is a block diagram for time series data evaluation based on detection of cyclic patterns in accordance with implementations of the present disclosure.

FIG. 5 is a block diagram for time series data evaluation 500 based on detection of cyclic patterns in accordance with implementations of the present disclosure.

The data evaluation 500 can be based on obtaining data observations 505, where the data observations 505 can be substantially similar to the obtained observations at 310 of FIG. 1, and can be data obtained at different data and time (for example, every day, every business day, every first Monday, every hours, every month, every month but August, or every month but August and December, among other example time occurrences when data is collected). The data observations 505 can be evaluated to define time occurrences 510 that correspond to the time occurrences 410 of FIGS. 4A and 4B.

In some instances, the time occurrences 510 can be evaluated whether they are occurring with irregular time gaps between one another. For example, in a list of time occurrences that corresponds to business days, the time gap between each and every time occurrence is not time same (for example, that can be measured in days, minutes, hours, or else).

If at 515, it is determined that the time occurrences are regularly spaced, then the process end. If at 515, it is determined that the time occurrences are irregularly spaced, then a list of time gaps 520 is generated. In some instances, the check at 515 may be omitted as an operation of the process 500, and any time occurrences 510 be they irregularly or regularly spaced may be provided to generate the list of time gaps 520. The list of time gaps can correspond to the list of time gaps 410 of FIGS. 4A and 4B. The list of time gaps 520 can be evaluated to detect cyclic patterns 525. The detection of cyclic patterns 525 can be substantially similar to the analysis performed at 420. In the cases where the list of time gaps 520 is created for time occurrences 510 that are regularly spaced, the list can be a list of ones (for example [1, 1, . . . , 1]), where a cyclic pattern can be determined to define a cycle with properties $\lambda=1$, $\mu=0$.

The evaluation of the time gaps list 520 can be executed as part of an analysis of distribution of the time occurrences 510. In some instances, the analysis of the distribution of the time occurrences 510 can include performing an iteratively evaluation of time gaps from the list of time gaps 520 using two reader operators. The two reader operators can be substantially similar to the slow Tortoise and fast Hare readers as described in relation to FIGS. 4A and 4B. The two readers can separately browse through the list 520. The readers can evaluate an iterated time gap from the list to determine list of seen subsequent elements in the list as described in relation to the iterations of FIGS. 4A and 4B. Each reader operator can identify, for each evaluated time gap, a set of subsequent time gaps after each evaluated time gap (for example, the seen set of time gaps as a horizon of a K elements from the list 410 of FIG. 4A). The iterative evaluation of the time gaps can be performed to determine a cycle in the list that comprises a cyclic set of subsequent time gaps from the list that are repetitive in the list of time gaps.

In some instances, at 525, a cyclic pattern is detected in the list of the time gaps 520 based on the iterative evaluation according to two readers. The detection of the cyclic pattern can include identifying (i) a length (for example, $\lambda$ as described in FIGS. 2, 3, and 4 and in equation (1) above) of cycles within the cycle patters and (ii) an index element (for example, as described in FIGS. 2, 3, and 4 and in equation (2) above) of a time gap of the list of time gaps that is associated with a start element of a first cycle identified in the list of time gaps.

In some instances, based on execution the detection of cyclic patterns 525 associated with the data observations 505, the output from that detection can be used to infer (or define) future dates 530 based on the detected cyclic pattern. The inferred future dates 530 can be input into another function or service that can directly receive as input an array of dates of a time series and output the future predicted data observation on the time horizon defined by the inferred future dates.

In some instances, the detection of the cyclic pattern 525 can be performed to determine a first occurring cycle in the list of time gaps, as described in relation to FIG. 4A, or can be used to iterate over the whole list to identify a last cycle that is identified in the time occurrences. By identifying a last cycle in the time occurrences, it can be inferred what is the latest cycle of that, and can be identified based on the obtaining observations and rely on that cycle for the inferring of future dates. In some instances, it can be understood that data observations time spacing can vary over time where at a first portion of the time occurrences 510 the sample distribution is different from the sample distribution at a subsequent portion of the time occurrences 510.

Figure 6:
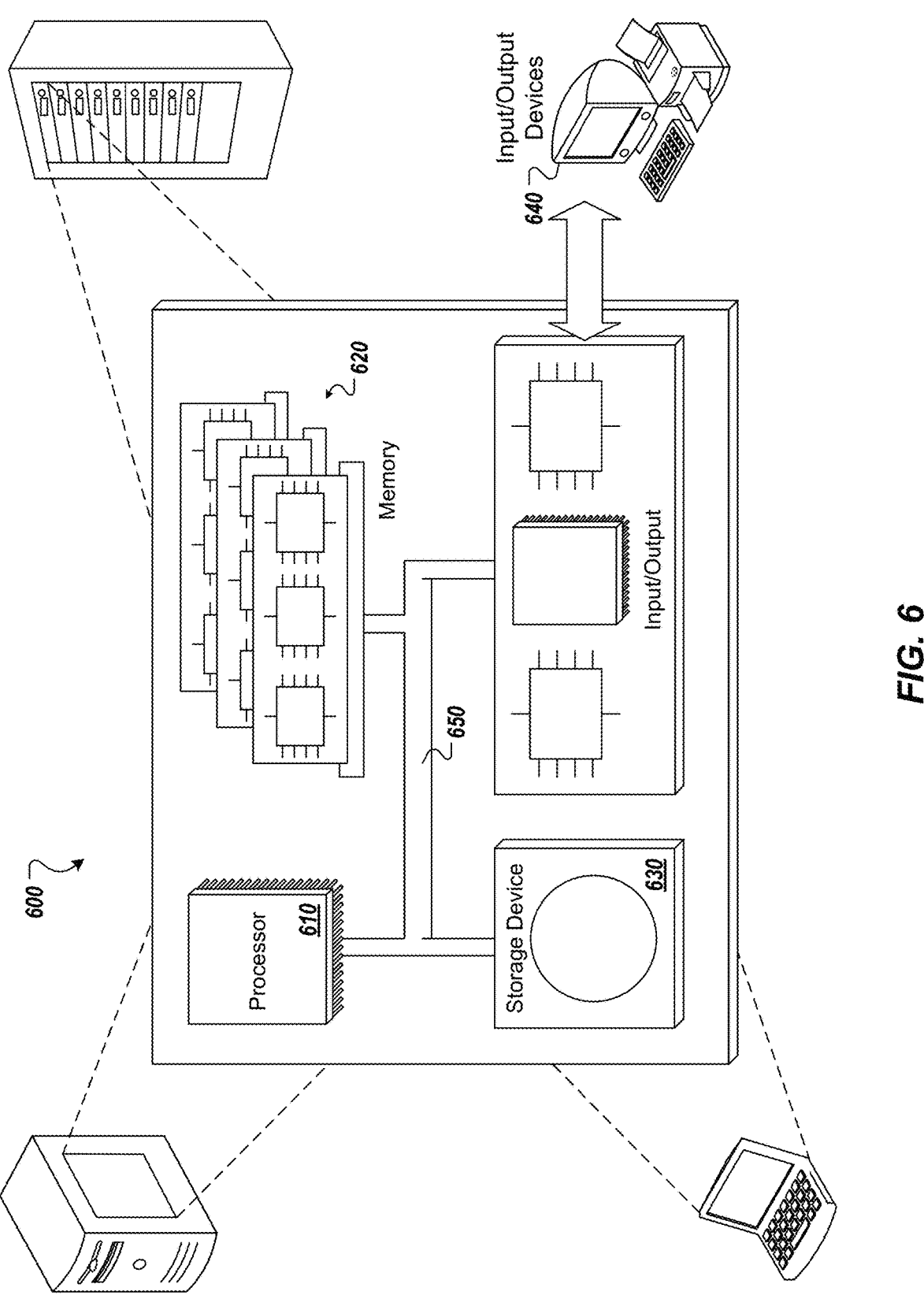
FIG. 6 is a schematic diagram of an example computer system that can be used to execute implementations of the present disclosure.

FIG. 6 is a schematic diagram of an example computer system 600 that can be used to execute implementations of the present disclosure. For example, the computer system 600 may be included in any or all of the server components discussed herein. The computer system 600 includes a processor 610, a memory 620, a storage device 630, and an input/output device 640. The components 610, 620, 630, and 640 are interconnected using a system bus 650. The processor 610 is capable of processing instructions for execution within the computer system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computer system 600. In some implementations, the memory 620 is a computer-readable medium. In some implementations, memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the computer system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including a stand-alone program or a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user, and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Example 1. A computer-implemented method, the method comprising:

obtaining data observations associated with respective time occurrences, wherein the respective time occurrences are spaced in time from each other with irregular time intervals;

analyzing a distribution of the respective time occurrences associated with the data observations to identify a cyclic pattern, wherein the analyzing comprises:

defining a list of time gaps between each of the data observations, wherein time gaps of the list of time gaps are defined according to a common time measure, and wherein each time gap in the list of time gaps is associated with a respective data observation;

iteratively evaluating, as evaluated time gaps, the time gaps of the list of time gaps using two reader operators that separately browse through the list of time gaps, wherein each reader operator identifies, for each evaluated time gap of the evaluated time gaps, subsequent time gaps after each evaluated time gap of the evaluated time gaps, wherein the iteratively evaluating is performed to determine a cycle in the list of time gaps that comprises a cyclic set of the subsequent time gaps of the list of time gaps that is repetitive in the list of time gaps; and identifying, as an identified cyclic pattern, a cyclic pattern in the list of time gaps based on the iteratively evaluating, wherein the identifying comprises identifying (i) a length of cycle within the cycle patterns and (ii) an index element of a time gap of the list of time gaps that is associated with a start element of a first cycle identified in the list of time gaps; and performing a data analysis over the data observations according to the identified cyclic pattern to generate a prediction model to predict future data observations.

Example 2. The computer-implemented method of Example 1, where the data observations are collected from a system monitoring process to identify availability of service resources.

Example 3. The computer-implemented method of any of the preceding Examples, wherein the data observations include data collected from an execution of a process flow at a platform system.

Example 4. The computer-implemented method of any of the preceding Examples, wherein the prediction model is used to predict the future data observations for a future horizon defined according to the cyclic pattern.

Example 5. The computer-implemented method of any of the preceding Examples, wherein the two reader operators perform iterative evaluation using two respective moving pointers through the time gaps of the list of time gaps to determine, at each iteration of each moving pointer, one or more sets of subsequent time gaps of the list of time gaps, wherein the two respective moving pointers are associated with a different iterative step between time gaps in the list of time gaps, wherein the cycle is determined when the cyclic set of subsequent time gaps is identified at a correspondingly iteratively evaluated time gap by each of the two reader operators.

Example 6. The computer-implemented method of Example 5, wherein each of the moving pointers iterate over a respective set of time gaps of the list of time gaps, wherein a first iterative step associated with a first moving pointer of a first reader operator is twice as slow as a second iterative step associated with a second moving pointer of a second reader operator.

Example 7. The computer-implemented method of any of the preceding Examples, wherein identifying the cyclic pattern comprises:

identifying a first time gap in the list of time gaps that is iterated using a first reader operator that is associated with a first set of subsequent time gaps of the list of time gaps that matches a second time gap in the list of time gaps that is iterated using a second reader operator that is associated with a second set of subsequent time gaps, wherein the first set of subsequent time gaps is equivalent to the second set of subsequent time gaps, and wherein the first time gap is different than the second time gap; and identifying the length of cycle to correspond to a number of time gaps in the first set of subsequent time gaps; and identifying the index element of a time gap of the list of time gaps as the start element of the cycle to correspond to a lowest index element of either a first index element corresponding to the first time gap or a second index element corresponding to the second time gap in the list of time gaps.

Example 8. The computer-implemented method of any of the preceding Examples, the method comprising:

generating a time series for distributing future data observations based on an initial time instance for the time series and the identified cyclic pattern.

Example 9. The computer-implemented method of any of the preceding Examples, wherein a first moving pointer associated with a first reader operator browses over each time gaps of the list of time gaps, wherein a second moving pointer associated with a second reader operator browses over every other time gap of the list of time gaps, wherein the first reader operator and the second reader operator terminate browsing when an evaluation occurs of two time gap instances associated with equivalent sets of subsequent time gaps within the list of time gaps.

Example 10. The computer-implemented method of any of the preceding Examples, wherein the common time measure is a unit of time selected from the group consisting of a day, a week, a month, a quarter, and a year.

Example 11. A system comprising:

one or more processors; and one or more computer-readable memories coupled to the one or more processors and having instructions stored thereon that are executable by the one or more processors to perform the method of any of Examples 1 to 10.

Example 12. A non-transitory, computer-readable medium coupled to one or more processors and having instructions stored thereon which, when executed by the one or more processors, cause the one or more processors to perform the method of any of Examples 1 to 10.

What is claimed is:

1. A computer-implemented method, the method comprising:

obtaining data observations associated with respective time occurrences associated with a monitored process executed on a platform system, wherein the respective time occurrences are spaced in time from each other with irregular time intervals;

analyzing a distribution of the respective time occurrences associated with the data observations to identify a cyclic pattern, wherein the analyzing comprises:

defining a list of time gaps, wherein a time gap is defined as a difference between each two consecutive data observations from a set of consecutive data observations, a number of consecutive data observations in the set being defined according to a time measure for the list, and wherein each time gap in the list of time gaps is associated with a respective data observation;

iteratively evaluating, as evaluated time gaps, lists of time gaps associated with data observations using two reader operators that separately browse through the lists of time gaps, wherein each of the two reader operators start from a respective position in the data observations, the respective positions where the two reader operators start being subsequent to one another, wherein each reader operator identifies, for each evaluated time gap of the evaluated time gaps, subsequent time gaps after each evaluated time gap of the evaluated time gaps, wherein the iteratively evaluating is performed to determine a cycle in the list of time gaps that comprises a cyclic set of the subsequent time gaps of the list of time gaps that is repetitive in the list of time gaps, and wherein the iterative evaluation of the time gaps using the two reader operators comprises:

performing iterative evaluation using two respective moving pointers through the time gaps of the list of time gaps to determine, at each iteration of each moving pointer, one or more sets of subsequent time gaps of the list of time gaps, wherein the two respective moving pointers are associated with a different iterative step between time gaps in the list of time gaps, and wherein the cycle is determined when the cyclic set of subsequent time gaps is identified at a correspondingly iteratively evaluated time gap by each of the two reader operators; and identifying, as an identified cyclic pattern, a cyclic pattern in the list of time gaps based on the iteratively evaluating, wherein the identifying comprises identifying (i) a length of cycle within the cycle patterns and (ii) an index element of a time gap of the list of time gaps that is associated with a start element of a first cycle identified in the list of time gaps;

performing a data analysis over the data observations according to the identified cyclic pattern to generate a prediction model to predict future data observations;

in response to receiving a request to predict a future horizon, executing the prediction model to obtain prediction result for the future horizon, and generating instructions including an adjustment of the execution of the monitored process for the future horizon according to the prediction result; and providing the instructions to the platform system.

2. The computer-implemented method of claim 1, the method comprising:

obtaining the data observations from a system monitoring the monitored process to identify availability of service resources associated with the process execution.

3. The computer-implemented method of claim 1, the method comprising:

obtaining the data observations as output from an execution of an instance of the monitored process on the platform system.

4. The computer-implemented method of claim 1, the method comprising:

predicting the future data observations based on executing the prediction model, wherein the future data observations are predicted for a future horizon defined according to the cyclic pattern.

5. The computer-implemented method of claim 1 wherein performing the iterative evaluation using two respective moving pointers through the time gaps of the list of time gaps comprises:

iterating, using each of the moving pointers, over a respective set of time gaps of the list of time gaps, wherein a first iterative step associated with a first moving pointer of a first reader operator is twice as slow as a second iterative step associated with a second moving pointer of a second reader operator.

6. The computer-implemented method of claim 1, wherein identifying the cyclic pattern comprises:

identifying a first time gap in the list of time gaps that is iterated using a first reader operator that is associated with a first set of subsequent time gaps of the list of time gaps that matches a second time gap in the list of time gaps that is iterated using a second reader operator that is associated with a second set of subsequent time gaps, wherein the first set of subsequent time gaps is equivalent to the second set of subsequent time gaps, and wherein the first time gap is different than the second time gap;

identifying the length of cycle to correspond to a number of time gaps in the first set of subsequent time gaps; and identifying the index element of a time gap of the list of time gaps as the start element of the cycle to correspond to a lowest index element of either a first index element corresponding to the first time gap or a second index element corresponding to the second time gap in the list of time gaps.

7. The computer-implemented method of claim 1, the method comprising:

generating a time series for distributing future data observations based on an initial time instance for the time series and the identified cyclic pattern.

8. The computer-implemented method of claim 1, wherein a first moving pointer associated with a first reader operator browses over each time gaps of the list of time gaps, wherein a second moving pointer associated with a second reader operator browses over every other time gap of the list of time gaps, wherein the first reader operator and the second reader operator terminate browsing when an evaluation occurs of two time gap instances associated with equivalent sets of subsequent time gaps within the list of time gaps.

9. The computer-implemented method of claim 1, wherein the time measure for the list is a unit of time selected from the group consisting of a day, a week, a month, a quarter, and a year.

10. A computer-implemented system comprising:

one or more processors; and one or more computer-readable memories coupled to the one or more processors and having instructions stored thereon that are executable by the one or more processors to perform operations comprising:

obtaining data observations associated with respective time occurrences associated with a monitored process executed on a platform system, wherein the respective time occurrences are spaced in time from each other with irregular time intervals;

analyzing a distribution of the respective time occurrences associated with the data observations to identify a cyclic pattern, wherein the analyzing comprises:

defining a list of time gaps, wherein a time gap is defined as a difference between each two consecutive data observations from a set of consecutive data observations, a number of consecutive data observations in the set being defined according to a time measure for the list, and wherein each time gap in the list of time gaps is associated with a respective data observation;

iteratively evaluating, as evaluated time gaps, lists of time gaps associated with data observations using two reader operators that separately browse through the lists of time gaps, wherein each of the two reader operators start from a respective position in the data observations, the respective positions where the two reader operators start being subsequent to one another, wherein each reader operator identifies, for each evaluated time gap of the evaluated time gaps, subsequent time gaps after each evaluated time gap of the evaluated time gaps, wherein the iteratively evaluating is performed to determine a cycle in the list of time gaps that comprises a cyclic set of the subsequent time gaps of the list of time gaps that is repetitive in the list of time gaps, and wherein the iterative evaluation of the time gaps using the two reader operators comprises:

performing iterative evaluation using two respective moving pointers through the time gaps of the list of time gaps to determine, at each iteration of each moving pointer, one or more sets of subsequent time gaps of the list of time gaps, wherein the two respective moving pointers are associated with a different iterative step between time gaps in the list of time gaps, and wherein the cycle is determined when the cyclic set of subsequent time gaps is identified at a correspondingly iteratively evaluated time gap by each of the two reader operators; and identifying, as an identified cyclic pattern, a cyclic pattern in the list of time gaps based on the iteratively evaluating, wherein the identifying comprises identifying (i) a length of cycle within the cycle patterns and (ii) an index element of a time gap of the list of time gaps that is associated with a start element of a first cycle identified in the list of time gaps;

performing a data analysis over the data observations according to the identified cyclic pattern to generate a prediction model to predict future data observations;

in response to receiving a request to predict a future horizon, executing the prediction model to obtain prediction result for the future horizon, and generating instructions including an adjustment of the execution of the monitored process for the future horizon according to the prediction result; and providing the instructions to the platform system.

11. The computer-implemented system of claim 10, wherein the one or more computer-readable memories further comprise instructions stored thereon, which when executed by the one or more processors perform operations comprising:

obtaining the data observations from a system monitoring the monitored process to identify availability of service resources associated with the process execution.

12. The computer-implemented system of claim 10, wherein the one or more computer-readable memories further comprise instructions stored thereon, which when executed by the one or more processors perform operations comprising:

obtaining the data observations as output from an execution of an instance of the monitored process on the platform system.

13. The computer-implemented system of claim 10, wherein the one or more computer-readable memories further comprise instructions stored thereon, which when executed by the one or more processors perform operations comprising:

predicting the future data observations based on executing the prediction model, wherein the future data observations are predicted for a future horizon defined according to the cyclic pattern.

14. The computer-implemented system of claim 10, wherein performing the iterative evaluation using two respective moving pointers through the time gaps of the list of time gaps comprises:

iterating, using each of the moving pointers, over a respective set of time gaps of the list of time gaps, wherein a first iterative step associated with a first moving pointer of a first reader operator is twice as slow as a second iterative step associated with a second moving pointer of a second reader operator.

15. A non-transitory, computer-readable medium coupled to one or more processors and having instructions stored thereon which, when executed by the one or more processors, cause the one or more processors to perform operations comprising:

obtaining data observations associated with respective time occurrences associated with a monitored process executed on a platform system, wherein the respective time occurrences are spaced in time from each other with irregular time intervals;

analyzing a distribution of the respective time occurrences associated with the data observations to identify a cyclic pattern, wherein the analyzing comprises:

defining a list of time gaps, wherein a time gap is defined as a difference between each two consecutive data observations from a set of consecutive data observations, a number of consecutive data observations in the set being defined according to a time measure for the list, and wherein each time gap in the list of time gaps is associated with a respective data observation;

iteratively evaluating, as evaluated time gaps, lists of time gaps associated with data observations using two reader operators that separately browse through the lists of time gaps, wherein each of the two reader operators start from a respective position in the data observations, the respective positions where the two reader operators start being subsequent to one another, wherein each reader operator identifies, for each evaluated time gap of the evaluated time gaps, subsequent time gaps after each evaluated time gap of the evaluated time gaps, wherein the iteratively evaluating is performed to determine a cycle in the list of time gaps that comprises a cyclic set of the subsequent time gaps of the list of time gaps that is repetitive in the list of time gaps, and wherein the iterative evaluation of the time gaps using the two reader operators comprises:

performing iterative evaluation using two respective moving pointers through the time gaps of the list of time gaps to determine, at each iteration of each moving pointer, one or more sets of subsequent time gaps of the list of time gaps, wherein the two respective moving pointers are associated with a different iterative step between time gaps in the list of time gaps, and wherein the cycle is determined when the cyclic set of subsequent time gaps is identified at a correspondingly iteratively evaluated time gap by each of the two reader operators; and identifying, as an identified cyclic pattern, a cyclic pattern in the list of time gaps based on the iteratively evaluating, wherein the identifying comprises identifying (i) a length of cycle within the cycle patterns and (ii) an index element of a time gap of the list of time gaps that is associated with a start element of a first cycle identified in the list of time gaps;

performing a data analysis over the data observations according to the identified cyclic pattern to generate a prediction model to predict future data observations;

in response to receiving a request to predict a future horizon, executing the prediction model to obtain prediction result for the future horizon, and generating instructions including an adjustment of the execution of the monitored process for the future horizon according to the prediction result; and providing the instructions to the platform system.

16. The non-transitory, computer-readable medium of claim 15, wherein the non-transitory, computer-readable medium further comprise instructions stored thereon, which when executed by the one or more processors perform operations comprising:

obtaining the data observations from a system monitoring the monitored process to identify availability of service resources associated with the process execution.

17. The non-transitory, computer-readable medium of claim 15, wherein the non-transitory, computer-readable medium further comprise instructions stored thereon, which when executed by the one or more processors perform operations comprising:

obtaining the data observations as output from an execution of an instance of the monitored process on the platform system.

18. The non-transitory, computer-readable medium of claim 15, wherein performing the iterative evaluation using two respective moving pointers through the time gaps of the list of time gaps comprises:

iterating, using each of the moving pointers, over a respective set of time gaps of the list of time gaps, wherein a first iterative step associated with a first moving pointer of a first reader operator is twice as slow as a second iterative step associated with a second moving pointer of a second reader operator.

\*   \*   \*   \*   \*